United States Patent Office 2,782,142
Patented Feb. 19, 1957

2,782,142

RECOVERY OF VALUABLE DEWAXING AIDS FROM WAXES

Albert N. De Vault, Bartlesville, Okla., assignor to Phillips Petroleum Company, a corporation of Delaware No Drawing. Application November 18, 1952, Serial No. 321,287

11 Claims. (Cl. 196—17)

This invention relates to the utilization of a wax separation aid, or crystallization regulator as it is often referred to in the art, in the separation of wax from wax-containing oils. In one aspect this invention relates to the removal of such a wax crystallization regulator, for example a condensation product of a chlorinated paraffin wax and naphthalene, from a wax that has been separated from a wax-bearing oil while employing the said condensation product as a dewaxing aid. In another aspect, this invention relates to the recovery of such a wax crystallization aid from a wax by adsorption on a solid adsorbent material and to the subsequent recovery of said condensation product from said solid adsorbent. In still another aspect this invention relates to the reuse of such wax crystallization aid recovered from said solid adsorbent as a dewaxing aid. In still another aspect this invention relates to the use of selected desorption solvents in effecting the above described recovery of wax separation aid from a solid adsorbent.

In the art of mineral oil dewaxing it has been found that various materials referred to herein as wax separation aids or wax crystallization regulators, when incorporated with the oil during the dewaxing process, aid materially in the separation of the wax from the oil. All such oil dewaxing processes have in common the step of separating the wax by chilling the oil to cause solidification of the wax.

In such a conventional process for separating wax from a waxy oil, the oil to be treated is admixed with a wax separation aid and with a selective solvent which shows a preferential solubility for oil over wax at the dewaxing temperature, such as propane or normally liquid solvent mixtures of benzene-acetone, benzene-ethyl ketone, and the like. The resulting solution is then chilled to a sufficiently low temperature to effect precipitation of the wax which is subsequently removed by filtration, settling, centrifuging, or the like. The concentration of the wax separation aid based on the oil to be treated is often within the range of from 0.01 to 5 weight percent, although concentrations outside this range can be employed, depending primarily on the dewaxing aid and the specific oil treated, and also on the specific process conditions employed.

Oil dewaxing processes of the type above described are conducted under conditions, dependent to a large extent on the selective solvent employed. In propane dewaxing, the propane-oil mixture is often cooled to a temperature within the limits of —40° F. to —60° F. For example, when dewaxing a lubricating oil such conditions provide for reduction of the pour point from about 35° F. to about 0° F. When employing a normally liquid solvent, the solvent-oil admixture is generally cooled to a temperature approximating the desired pour point of the oil under which conditions the required amount of dewaxing is generally obtained. In any such solvent dewaxing process, the separation aid employed to promote dewaxing, is precipitated with the wax.

In accordance with my invention, a wax crystallization regulator, for example a condensation product of a chlorinated paraffin wax and naphthalene, employed during solvent dewaxing of a wax-bearing oil, and present in wax separated from the oil by the said dewaxing, is removed from the separated wax by contacting same in a molten state with a solid adsorbent material, such as bauxite, fuller's earth, silica gel, alumina, silica-alumina, and the like whereby the dewaxing aid is selectively adsorbed by the adsorbent. The resulting enriched adsorbent in one embodiment is then contacted with a selected desorbent liquid comprising either a single organic liquid containing one of the groups, —OH or C=O, or a mixture of polar and non-polar liquids, under which conditions desorption of the adsorbed wax separation aid is effected. Wax separation aid is then recovered from the liquid containing same and can be recycled directly to the dewaxing step for reuse as a wax separation aid. I prefer, prior to the desorption, to wash the solid adsorbent with a solvent such as a normally liquid hydrocarbon to remove any wax mechanically adhering thereto.

In one embodiment adsorbed separation aid can be directly desorbed from the solid adsorbent into the wax-bearing oil prior to dewaxing, being thereby available in the wax-bearing oil for reuse as a wax separation aid. This is done by first incorporating in the wax-bearing oil a suitable amount of desorbent solvent of this invention, for example from 1.0 to 10.0 volumes per volume of oil, and then contacting the enriched solid adsorbent with the resulting mixture of wax-bearing oil and desorbent solvent under desorption temperature conditions of this invention. The desorbent solvent is removed from the resulting mixture of wax-bearing oil and separation aid prior to the dewaxing step.

Prior to reuse of the solid adsorbent, i. e., subsequent to desorption of the separation aid therefrom, adsorbed desorbent solvent must be removed, i. e., the solid adsorbent must be regenerated. This regeneration may be carried out in any suitable manner such as by heating the solid adsorbent material at 100° C. or higher while passing an inert gas through it, or by burning off the desorbent solvent, care being taken so as to not allow the combustion temperature to become so high as to harm the adsorption properties of the solid adsorbent.

A specific wax separation aid which is employed according to this invention is a condensation product of a chlorinated paraffin wax with naphthalene, which is well known in the prior art, one form of which is prepared commercially and is available on the open market as Paraflow. This type of compound is generally prepared by a catalyzed condensation employing a Friedel-Crafts catalyst, particularly aluminum chloride. Exemplary of one such preparation or condensation, is the incorporation of about 90 parts of a chlorinated paraffin wax described hereinafter with about 10 parts of naphthalene and 10 parts of aluminum chloride, employing a sufficient quantity of kerosene to dissolve the organic reactants, and then permitting the components of the mixture to react at about 75° F. for a period as long as 24 hours, during this latter period the temperature having risen to as high as 200° F. The heavy oil condensate thus formed can be recovered as a residual product of distillation of the aluminum chloride-free reaction mixture. The chlorinated wax can be prepared by direct chlorination of a paraffin wax having a melting point such as one at about 125° F. at a temperature of about 175–225° F. for a period of 15 to 30 hours. The resulting condensation product of the chlorinated paraffin wax and naphthalene often has a chlorine content of from about 2–10 weight percent although obviously the actual chlorine content may vary outside this range dependent upon the preparative method employed, i. e., either the direct chlorination or the condensation both above described. Other crystallization regulators are "Santopour" and "Acryloid 150." "Santopour" comprises paraffin wax-aromatic condensation products derived by the Friedel-Crafts reaction. "Acryloid" is a high molecular weight polymerization product of the esters of methacrylic acid and higher fatty alcohols such as cetyl or lauryl alcohol.

It is to be understood that one skilled in the art in possession of this disclosure can adapt the claimed invention to other wax crystallization regulators, it being clear that the invention is one which is essentially of a physical nature.

My invention is applied to any wax containing a crystallization regulator, for example a condensate of the type described, and recovered from any wax-containing oil by solvent dewaxing employing the said condensate as a dewaxing aid. Such wax-containing oils include waxy crudes, waxy cylinder stocks, waxy bright stocks, waxy neutral stocks, and broadly any wax-containing oil having a viscosity not less than about 60 SUS at 100° F. My invention is particularly applied to waxes recovered from refined but waxy fractions especially suitable for preparation of lube oil from lube oil stocks, as for example, a waxy raffinate prepared by first distilling a lubricating oil crude to produce a distillate lube oil base, and then solvent extracting the distillate, for example with phenol, furfural and the like, from which extraction a solvent-free raffinate is obtained.

Desorption of the dewaxing aid from the solid adsorbent can be accomplished by use of a single component liquid which combines the properties of a good organic solvent and polarity, as for example methylisobutyl ketone. Alcohols and ketones are examples of the general types of compounds which are suitable as single component solvents. These compounds contain from 4 to 10 carbon atoms in the molecule, preferably from 4 to 8 carbon atoms, and each compound contains a functional group in the molecule which confers polarity on it, e. g., —OH or >C=O. Exemplary of alcohols and ketones particularly suitable as single component solvents herein are: methylisobutyl ketone, methyl isopropyl ketone, methyl n-propyl ketone, isobutyl alcohol, and n-butyl alcohol.

Desorption can also be carried out by use of a solvent mixture, i. e., a polar-nonpolar mixture containing preferably these components in a volume ratio of about 1:1, although such a ratio within the range of 0.50:1 to 1.5:1 can be employed. Exemplary of such solvent mixtures are ethanol-toluene, water-naphtha, steam-naphtha, and propanol-naphtha, and ethanol-xylene and other combinations not specifically named, of these polar and nonpolar components.

The desorbent solvent mixtures above described appear to function (1) to displace the wax-separation aid from the adsorbent and (2) to dissolve the separation aid thus displaced, i. e., the desorbate, and therefore constitute a significant class of solvents particularly applicable to the process of this invention.

When contacting the enriched adsorbent, i. e., adsorbent plus adsorbed wax crystallization regulator, the latter also referred to herein as adsorbate, directly with the wax-bearing oil feed containing desorbent solvent, as above described, the enriched adsorbent is advantageously first washed to remove any wax mechanically adhered thereto. Adsorbent freed of wax separation aid is then removed from contact with the wax-bearing oil feed and, subsequent to freeing it from the adsorbed desorption solvent, is ready for reuse in the adsorption step as a solid adsorbent in the recovery of wax separation aid from the separated wax.

Adsorption temperatures employed in the practice of my invention although preferably about 10–15° F. above the melting point of the wax can be higher, as for example about 15 to 100° F. above the melting point of the wax.

In one specific embodiment of my invention, a waxy lubricating oil stock such as a solvent-free raffinate obtained by the distillation of a lubricating oil crude, followed by solvent extraction of the resulting distillate, is admixed with from 0.01 to 5.0 percent of its weight of a condensation product of a chlorinated paraffin wax and naphthalene of the type described above, and dissolved in liquid propane under super atmospheric pressure. The resulting admixture is then chilled by reducing the pressure of the system to vaporize propane. By reducing the pressure to as low as atmospheric pressure, a temperature of about −40° F. can be obtained. Under these conditions wax present in the oil is caused to solidify, the dewaxing having been facilitated by the dewaxing aid, i. e., by the condensation product described above. The chilled mixture is then filtered, centrifuged, or cold settled to precipitate the wax from the chilled mixture, the dewaxing aid also precipitating from the admixture with the wax.

The wax thus separated is then treated for removal of the dewaxing aid therefrom, by percolating the wax through a bed of solid adsorbent of the type already discussed as for example granular bauxite at a temperature preferably near the melting point of the wax as for example from 10–15° F. above its melting point.

Subsequent to percolation, generally after passing from 0.1 to 10 parts by volume of the molten wax in contact with the solid adsorbent, the enriched adsorbent is washed with a washing solvent such as pentane, hexane, heptane, octane, natural gasoline fractions, etc., to remove any wax mechanically adhering thereto, although if desired the washing can be dispensed with as it is not absolutely necessary. Generally the wax can be removed by washing as described, employing from 1 to 2 volumes of solvent per volume of solid adsorbent to be washed. However, the specific volume of solvent employed may well be outside this range dependent on, as for example, the amount of wax laid down on the adsorbent in any one case, and condition of the adsorbent surfaces during adsorption which in turn may affect the efficiency of the washing, and the like.

The washing adsorbent containing the adsorbed dewaxing air, i. e., the condensation product described above, is then treated for removal of the adsorbed separation aid. This can be done by contacting the solid adsorbent with a single component solvent or a solvent mixture of the type discussed hereinabove. The resulting solvent solution of desorbate is then distilled to yield the desorbed dewaxing aid as a residual displacement product which can then be returned to the dewaxing system for reuse.

This invention is further illustrated with reference to the following examples:

*Example I*

An admixture of 100 grams of a commercial petroleum paraffin wax available on the open market as Parawax, and 2 grams of a product of condensation of a chlorinated paraffin wax and naphthalene, was percolated through a bed of 130 cc. of granular activated bauxite at 168° F. Under these conditions the said condensation product was selectively adsorbed from the wax onto the bauxite surfaces. The bauxite was then washed with 100 ml. of n-heptane to remove unabsorbed wax, i. e., mechanically adhering to the bauxite surfaces. The bauxite, free from mechanically adhering wax and containing adsorbed condensation product, was then contacted with 125 cc. of a mixture (1:1 by volume) of ethyl alcohol and toluene at about room temperature. Thereafter the alcohol-toluene mixture containing condensate desorbed from the bauxite was distilled, from which distillation 8.6 grams of solvent free material was recovered as residual distillation product.

This residual distillation product was an active pour point depressant (or dewaxing aid) and when dissolved in a dewaxed neutral oil stock (one percent) having a plus 30 ASTM pour point, caused a reduction of that pour point value to —15° F.

Example II

An SAE 20 lube oil stock recivered from a Mid-Continent lubricating crude was propane dewaxed, employing the dewaxing aid of Example I. The total wax precipitated, i. e., "slack wax," was then percolated through a bed of granular bauxite to selectively adsorb dewaxing aid therefrom. The wax mechanically adhering to the bauxite following the percolation was washed free with n-heptane. Desorption of the adsorbed material from the bauxite was carried out in accordance with the process of Example I, employing an alcohol-toluene (1:1 volume ratio) solution, followed by contacting with methyl isobutyl ketone. The following data are pertinent to this operation:

Dewaxing plant data:
    Wax content of waxy oil, wt. percent_____ 8.0
    Oil content of slack wax, wt. percent_____ 16.0
    Slack wax yield, wt. percent_____ 9.3
    Dewaxing aid used, wt. percent_____ 0.15
    Maximum theoretical dewaxing aid content of
        slack wax, wt. percent_____ 1.61

Percolation and adsorption data (167° F.—percolation temperature):
    Weight bauxite_____g__ 81
    Weight slack wax charged_____g__ 92.0
    Weight filtrate (water white)_____g__ 89.7
    Desorbed dewaxing aid from bauxite_____g__ 2.66
    Assay of activity of desorbed dewaxing aid
                                          percent__ 50
    Dewaxing aid recovered from slack wax
                                          percent__ 1.45
    Percent recovery of theoretical aid value_____ 90

Desorption procedure:
 (1) Wash wax from bauxite with n-heptane.
 (2) Desorb dewaxing aid from the bauxite with ethyl alcohol-toluene (50:50) followed by desorption with methyl isobutyl ketone.

Example III 153 grams of molten wax containing 5 percent of its weight of Paraflow defined hereinabove, was percolated through a bed of 81 grams of granular bauxite at 180° F. 119.5 grams of wax was recovered from the percolation. The bauxite was then washed with 100 ml. of n-heptane to remove the mechanically retained wax; 30 grams of wax was recovered. The dewaxing aid was then desorbed from the bauxite by contacting the enriched bauxite with 250 ml. of methyl isobutyl ketone at about 25° F. 2.48 grams of the dewaxing aid was recovered from the methyl isobutyl ketone. Approximately 100 ml. of toluene was then passed through the bauxite, from which an additional 0.24 gram of dewaxing aid was recovered.

The concentration of active ingredient in the Paraflow was found to be approximately 50 percent and therefore the amount of dewaxing aid charged to the bauxite was about 3.8 grams. Therefore, the recovery of the dewaxing aid by the methyl isobutyl ketone treatment was about 65 percent, or based on the entire material balance was about 72 percent.

Reasonable variation and modification are possible within the scope of the foregoing disclosure and the appended claims to the invention, the essence of which is a method for the recovery of a wax separation aid, for example a condensate (prepared from a chlorinated paraffin wax and naphthalene) present in a wax separated from a wax bearing oil by a solvent dewaxing procedure employing the said condensate as a dewaxing aid; the recovery comprising the steps of passing the wax thus separated, in a molten state, in contact with a solid adsorbent material whereby the wax separation aid therein is selectively adsorbed on the surfaces of the adsorbent, and, desorption of the separation aid and reuse of same when desired as a dewaxing aid. The separate desorption step can be dispensed with by contacting the enriched adsorbent with the wax-bearing oil to be charged to the dewaxing zone, and containing a suitable quantity of desorbing liquid, as discussed hereinabove, whereby desorption takes place and the desorbed material is available after removal of the desorbent liquid from the wax bearing oil mixture to function as a wax separation aid during the dewaxing process. In the practice of the last described embodiment the need for a separate desorption step is eliminated.

I claim:

1. A process for the recovery of a wax crystallization aid selected from the group consisting of a condensation product of a chlorinated paraffin wax and naphthalene, a product of condensation of paraffin wax and an aromatic hydrocarbon, and a polymerization product of an ester of methacrylic acid and a fatty alcohol, present in a wax separated from a wax-bearing hydrocarbon oil by solvent dewaxing employing said wax crystallization aid, comprising passing said wax through a fixed bed of a solid adsorbent at a temperature of at least 10° F. above the melting point of said wax in an amount within the limits of 0.1 to 10 volumes per volume of said solid adsorbent, whereby said crystallization aid present in said wax is adsorbed by said solid adsorbent and a minor portion of said wax is mechanically retained on said solid adsorbent, washing said wax from the surface of said adsorbent, separating adsorbed crystallization aid from said solid adsorbent by passing in contact therewith a desorbent solvent selected from the group consisting of a single component organic solvent containing from 4 to 10 carbon atoms in the molecule and a functional group selected from the group consisting of $>C=O$ and —OH, and a mixture of polar and nonpolar solvents, and recovering said crystallization aid from said desorbent solvent as a product of the process.

2. The process of claim 1 wherein said desorbent solvent is a mixture of toluene and ethanol.

3. The process of claim 1 wherein said desorbent solvent is methylisobutyl-ketone.

4. In a process for solvent dewaxing a wax-bearing hydrocarbon oil employing a condensation product of a chlorinated paraffin wax and naphthalene as a wax separation aid, said separation aid precipitating together wth wax from said oil during said dewaxing, the improvement of recovering said condensation product for reuse in said solvent dewaxing, comprising passing wax separated from said oil, through a fixed bed of bauxite at a temperature above the melting point of said wax, whereby condensation product from said wax is adsorbed on the surfaces of said bauxite and a minor portion of wax is mechanically retained on said bauxite, washing mechanically retained wax free from said bauxite, contacting bauxite enriched with adsorbed condensation product with a desorbent solvent selected from the group consisting of a single component organic solvent containing from 4 to 10 carbon atoms in the molecule and a functional group selected from the group consisting of $>C=O$ and —OH, and a mixture of polar and nonpolar solvents and then recovering condensation product from said desorbent solvent, and recycling condensation product thus recovered, to the zone of said dewaxing.

5. In a process for solvent dewaxing a wax-bearing hydrocarbon oil employing a wax separation aid selected from the group consisting of a condensation product of a chlorinated paraffin wax and naphthalene, a product of condensation of paraffin wax and an aromatic hydrocarbon, and a polymerization product of an ester of methacrylic acid and a fatty alcohol, said wax separation aid precipitating together with wax from said oil, the improvement of recovering said wax separation aid for reuse in said solvent dewaxing, comprising passing wax separated from said oil, through a fixed bed of a solid adsorbent at a temperature above the melting point of said wax, whereby said wax separation aid from said wax is adsorbed on the surfaces of said solid adsorbent, contacting adsorbent thus enriched with said wax separation aid, with a wax-bearing oil to be charged to said dewaxing and containing a desorbent solvent selected from the group consisting of a single component organic solvent containing from 4 to 10 carbon atoms in the molecule and a functional group selected from the group consisting of $>C=O$ and $—OH$, and a mixture of polar and nonpolar solvents, whereby wax separation aid is desorbed from said adsorbent and is present in said oil charge and is active therein as a wax separation aid during the subsequent dewaxing step, and removing desorbent solvent from the resulting mixture of oil charge and separation aid prior to said subsequent dewaxing.

6. The process of claim 4 wherein said mechanically retained wax is washed from said bauxite by contacting said bauxite with a normally liquid hydrocarbon.

7. The process of claim 6, wherein said normally liquid hydrocarbon is n-heptane.

8. The process of claim 4 wherein said desorbent solvent is an alcohol-toluene mixture containing alcohol to toluene in a volume ratio of from 0.50:1 to 1.5:1.

9. The process of claim 4 wherein said desorbent solvent is methyl isobutyl ketone.

10. In a process for solvent dewaxing a wax-bearing hydrocarbon oil employing a product of condensation of a chlorinated paraffin wax and naphthalene as a wax separation aid, the said wax separation aid precipitating together with wax from said oil, the improvement of recovering said wax separation aid for reuse in said solvent dewaxing, comprising passing wax separated from said oil, through a fixed bed of a solid adsorbent at a temperature above the melting point of said wax, whereby said wax separation aid from said wax is adsorbed on the surfaces of said solid adsorbent, contacting adsorbent thus enriched with said wax separation aid, with a wax-bearing oil to be charged to said dewaxing and containing a desorbent solvent selected from the group consisting of a single component organic solvent containing from 4 to 10 carbon atoms in the molecule and a functional group selected from the group consisting of $>C=O$ and $—OH$, and a mixture of polar and nonpolar solvents, whereby wax separation aid is desorbed from said adsorbent and is present in said oil charge and is active therein as a wax separation aid during the subsequent dewaxing step, and removing desorbent solvent from the resulting mixture of oil charge and separation aid prior to said subsequent dewaxing.

11. In a process for solvent dewaxing a wax-bearing hydrocarbon oil employing a condensation product of a chlorinated paraffin wax and naphthalene as a wax separation aid, said separation aid precipitating together with wax from said oil during said dewaxing, the improvement of recovering said condensation product for reuse in said solvent dewaxing, comprising passing wax separated from said oil, through a fixed bed of a solid adsorbent material at a temperature above the melting point of said wax, whereby condensation product from said wax is adsorbed on the surfaces of said solid adsorbent material and a minor portion of wax is mechanically retained on said solid adsorbent material, contacting said solid adsorbent material enriched with adsorbed condensation product with a desorbent solvent selected from the group consisting of a single component organic solvent containing from 4 to 10 carbon atoms in the molecule and a functional group selected from the group consisting of $>C=O$ and $—OH$, and a mixture of polar and nonpolar solvents, and recovering condensation product from said desorbent solvent.

References Cited in the file of this patent

UNITED STATES PATENTS

| | | |
|---|---|---|
| 1,881,643 | Jones | Oct. 11, 1932 |
| 2,031,108 | Hopper | Feb. 18, 1936 |
| 2,049,046 | Bray | July 28, 1936 |
| 2,123,833 | Knowles | July 12, 1938 |
| 2,129,752 | Whiteley | Sept. 13, 1938 |
| 2,131,569 | Gross | June 6, 1939 |
| 2,586,198 | Backlund et al. | Feb. 19, 1952 |
| 2,596,942 | Robertson et al. | May 13, 1952 |
| 2,612,465 | Kiersted et al. | Sept. 30, 1952 |